United States Patent
Schillo-Armstrong et al.

(10) Patent No.: US 10,702,974 B2
(45) Date of Patent: Jul. 7, 2020

(54) CURABLE COMPOSITION, ABRASIVE ARTICLE, AND METHOD OF MAKING THE SAME

(71) Applicant: 3M INNOVATIVE PROPERTIES COMPANY, St. Paul, MN (US)

(72) Inventors: Melissa C. Schillo-Armstrong, Stillwater, MN (US); Hae-Seung Lee, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/099,031

(22) PCT Filed: May 1, 2017

(86) PCT No.: PCT/US2017/030353
§ 371 (c)(1),
(2) Date: Nov. 5, 2018

(87) PCT Pub. No.: WO2017/192426
PCT Pub. Date: Nov. 9, 2017

(65) Prior Publication Data
US 2019/0185658 A1   Jun. 20, 2019

Related U.S. Application Data

(60) Provisional application No. 62/332,908, filed on May 6, 2016.

(51) Int. Cl.
| | |
|---|---|
| *B24D 3/28* | (2006.01) |
| *B24D 5/12* | (2006.01) |
| *B24D 3/34* | (2006.01) |
| *C08K 3/22* | (2006.01) |
| *C08K 5/544* | (2006.01) |
| *C08K 9/02* | (2006.01) |
| *C08L 61/06* | (2006.01) |

(52) U.S. Cl.
CPC ............. *B24D 3/28* (2013.01); *B24D 3/34* (2013.01); *B24D 5/12* (2013.01); *C08K 3/22* (2013.01); *C08K 5/544* (2013.01); *C08K 9/02* (2013.01); *C08L 61/06* (2013.01); *C08K 2003/2227* (2013.01); *C08K 2201/009* (2013.01)

(58) Field of Classification Search
CPC . C09C 3/12; C09C 1/407; C08L 61/04; C08L 61/06; C08L 61/12; C08L 61/16
See application file for complete search history.

(56) References Cited

U.S. PATENT DOCUMENTS

| | | |
|---|---|---|
| 1,910,444 A | 5/1933 | Nicholson |
| 2,958,593 A | 11/1960 | Hoover |
| 3,041,156 A | 6/1962 | Rowse |
| 3,071,156 A | 1/1963 | Porland |
| 4,314,827 A | 2/1982 | Leitheiser |
| 4,623,364 A | 11/1986 | Cottringer |
| 4,652,275 A | 3/1987 | Bloecher |
| 4,734,104 A | 3/1988 | Broberg |
| 4,737,163 A | 4/1988 | Larkey |
| 4,744,802 A | 5/1988 | Schwabel |
| 4,751,138 A | 6/1988 | Tumey |
| 4,770,671 A | 9/1988 | Monroe |
| 4,799,939 A | 1/1989 | Bloecher |
| 4,881,951 A | 11/1989 | Wood |
| 4,991,362 A | 2/1991 | Heyer |
| 4,997,461 A | 3/1991 | Markhoff-Matheny |
| 5,009,675 A | 4/1991 | Kunz |
| 5,011,508 A | 4/1991 | Wald |
| 5,042,991 A | 8/1991 | Kunz |
| 5,085,671 A | 2/1992 | Martin |
| 5,096,762 A * | 3/1992 | Yoshida ............ C08L 63/00 428/76 |
| 5,152,917 A | 10/1992 | Pieper |
| 5,162,156 A | 11/1992 | Troughton |
| 5,164,348 A | 11/1992 | Wood |
| 5,178,646 A | 1/1993 | Barber, Jr. |
| 5,201,916 A | 4/1993 | Berg |
| 5,203,884 A | 4/1993 | Buchanan |
| 5,213,591 A | 5/1993 | Celikkaya |
| 5,352,254 A | 10/1994 | Celikkaya |
| 5,366,523 A | 11/1994 | Rowenhorst |
| 5,417,726 A | 5/1995 | Stout |
| 5,435,816 A | 7/1995 | Spurgeon |

(Continued)

FOREIGN PATENT DOCUMENTS

| | | |
|---|---|---|
| JP | 2003/534440 | 11/2003 |
| JP | 2004-090149 | * 3/2004 |
| JP | 3937739 | 4/2007 |
| JP | 2015166125 | 9/2015 |
| WO | WO 2011-139562 | 11/2011 |
| WO | WO 2017-062482 | 4/2017 |

OTHER PUBLICATIONS

Matinlinna, "Isocyanato- and Methacryloxysilanes Promote Bis-GMA Adhesion to Titanium", Journal of Dental Research, 2005, vol. 84, No. 04, pp. 360-364.

(Continued)

*Primary Examiner* — Marc S Zimmer
(74) *Attorney, Agent, or Firm* — Bradford B. Wright

(57) ABSTRACT

A curable composition comprises a phenolic resin and isocyanate-functionalized abrasive particles. The isocyanate-functionalized abrasive particles consist of the reaction product of at least one isocyanate-functional organosilane and abrasive particles. Abrasive articles and methods of making them using the isocyanate-functionalized abrasive particles are also disclosed.

3 Claims, 1 Drawing Sheet

(56) References Cited

U.S. PATENT DOCUMENTS

| | | |
|---|---|---|
| 5,496,386 A | 3/1996 | Broberg |
| 5,520,711 A | 5/1996 | Helmin |
| 5,551,963 A | 9/1996 | Larmie |
| 5,554,068 A | 9/1996 | Carr |
| 5,591,239 A | 1/1997 | Larson |
| 5,609,706 A | 3/1997 | Benedict |
| RE35,570 E | 7/1997 | Rowenhorst |
| 5,645,619 A | 7/1997 | Erickson |
| 5,672,097 A | 9/1997 | Hoopman |
| 5,681,361 A | 10/1997 | Sanders, Jr. |
| 5,712,210 A | 1/1998 | Windisch |
| 5,766,277 A | 6/1998 | DeVoe |
| 5,858,140 A | 1/1999 | Berger |
| 5,928,070 A | 7/1999 | Lux |
| 5,946,991 A | 9/1999 | Hoopman |
| 5,954,844 A | 9/1999 | Law |
| 5,961,674 A | 10/1999 | Gagliardi |
| 5,975,987 A | 11/1999 | Hoopman |
| 5,984,988 A | 11/1999 | Berg |
| 6,017,831 A | 1/2000 | Beardsley |
| 6,129,540 A | 10/2000 | Hoopman |
| 6,207,246 B1 | 3/2001 | Moren |
| 6,228,133 B1 | 5/2001 | Thurber |
| 6,277,161 B1 | 8/2001 | Castro |
| 6,302,930 B1 | 10/2001 | Lux |
| 6,350,799 B1 | 2/2002 | Wang |
| 6,586,483 B2 | 7/2003 | Kolb |
| 7,887,608 B2 | 2/2011 | Schwabel |
| 8,021,449 B2 | 9/2011 | Seth |
| 8,034,137 B2 | 10/2011 | Erickson |
| 8,142,531 B2 | 3/2012 | Adefris |
| 8,142,532 B2 | 3/2012 | Erickson |
| 8,142,891 B2 | 3/2012 | Culler |
| 2002/0026752 A1 | 3/2002 | Culler |
| 2002/0037964 A1 | 3/2002 | Miyata |
| 2004/0118051 A1 | 6/2004 | Shiho |
| 2006/0241215 A1* | 10/2006 | Osada ............... C08G 59/245 523/457 |
| 2009/0165394 A1 | 7/2009 | Culler |
| 2009/0169816 A1 | 7/2009 | Erickson |
| 2012/0227333 A1 | 9/2012 | Adefris |
| 2013/0040537 A1 | 2/2013 | Schwabel |
| 2013/0125477 A1 | 5/2013 | Adefris |
| 2015/0158149 A1* | 6/2015 | Vela ..................... B24D 13/08 451/538 |

OTHER PUBLICATIONS

Zhuang, "Novel Synthetic Route to Biobased Silylated Soybean Oil for Use as Coating Material", 2011, Master of Science Thesis, Michigan State University, Chemical Engineering, 86 pages.

International Search Report for PCT International Application No. PCT/US2017/030353, dated Sep. 6, 2017, 5 pages.

* cited by examiner

CURABLE COMPOSITION, ABRASIVE ARTICLE, AND METHOD OF MAKING THE SAME

TECHNICAL FIELD

The present disclosure broadly relates to abrasive articles and methods and materials for making them.

BACKGROUND

Abrasive articles generally include abrasive particles retained in a binder material. Common classes of abrasives include metal bond (i.e., the binder material is metallic), vitreous bond (i.e., the binder material is vitreous), and resin bond (i.e., the binder material is a cured organic resin).

Bonded abrasive articles have abrasive particles retained in a binder (also known in the art as a bonding matrix or binder material) that bonds them together as a shaped mass. Examples of typical bonded abrasives include grinding wheels, stones, hones, and cut-off wheels. The binder can be an organic resin (resin bond), a ceramic or glassy material (vitreous bond), or a metal (metal bond).

Cut-off wheels are typically relatively thin wheels used for general cutting operations. The wheels are typically about 1 to about 200 centimeters in diameter, and several millimeters to several centimeters thick (with greater thickness for the larger diameter wheels). They may be operated at speeds from about 1000 to 50000 revolutions per minute, and are used for operations such as cutting polymer, composite metal, or glass, for example, to nominal lengths. Cut-off wheels are also known as "industrial cut-off saw blades" and, in some settings such as foundries, as "chop saws". As their name implies, cut-off wheels are used to cut stock such as, for example, metal rods, by abrading through the stock.

With bonded abrasive articles, properties such as cutting rate and durability are important. For example, in the case of commercially available cut-off wheels, cutting performance may decline by more than half after relatively short usage. There is a continuing need for new resin bond abrasives that have improved abrading properties and/or reduced cost at the same performance level.

SUMMARY

In one aspect the present disclosure provides a curable composition comprising a phenolic resin and isocyanate-functionalized abrasive particles, wherein the isocyanate-functionalized abrasive particles consist of the reaction product of at least one isocyanate-functional organosilane and abrasive particles. The present disclosure likewise provides an at least partially cured curable composition, prepared by at least partially curing the curable composition.

The curable composition is useful, for example, for making an abrasive article.

Accordingly, the present disclosure also provides a method of making an abrasive article, the method comprising at least partially curing a curable composition, wherein the curable composition comprises a phenolic resin and isocyanate-functionalized abrasive particles, wherein the isocyanate-functionalized abrasive particles consist of the reaction product of at least one isocyanate-functional organosilane and abrasive particles.

In yet another aspect, the present disclosure provides an abrasive article comprising abrasive particles retained in a binder, wherein the binder comprises a cured curable composition, wherein the curable composition comprises a phenolic resin and isocyanate-functionalized abrasive particles, and wherein the isocyanate-functionalized abrasive particles consist of the reaction product of at least one isocyanate-functional organosilane and abrasive particles.

Advantageously, abrasive articles made according to the present disclosure may exhibit improved abrading performance as compared to corresponding abrasive articles made without added isocyanate-functional organosilane.

As used herein, the term "isocyanate-functionalized abrasive particle" means that at least one isocyanate group is directly or indirectly (i.e., through one or more additional covalently bonded atoms) covalently bonded to the abrasive particle.

As used herein, the term "phenolic resin" refers to a synthetic thermosetting resin obtained by the reaction of at least one phenol (e.g., phenol, resorcinol, m-cresol, 3,5-xylenol, t-butylphenol, and/or p-phenylphenol) with at least one aldehyde (e.g., formaldehyde, acetaldehyde, chloral, butyraldehyde, furfural, and/or acrolein).

Features and advantages of the present disclosure will be further understood upon consideration of the detailed description as well as the appended claims.

Figure 1:
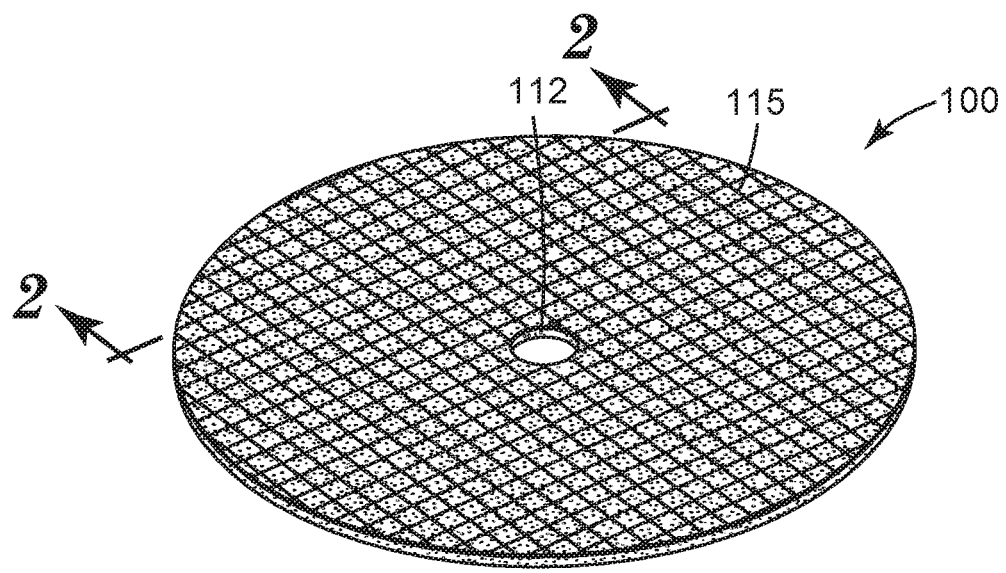
FIG. 1 is a schematic perspective view of an exemplary bonded abrasive wheel 100 according to one embodiment of the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Curable compositions according to the present disclosure comprise a phenolic resin and isocyanate-functionalized abrasive particles. The isocyanate-functionalized abrasive particles consist of the reaction product of at least one isocyanate-functional organosilane and abrasive particles.

Useful phenolic resins may include novolac and resole phenolic resins. Novolac phenolic resins are characterized by being acid-catalyzed and having a ratio of formaldehyde to phenol of less than one, typically between 0.5:1 and 0.8:1. Resole phenolic resins are characterized by being alkaline catalyzed and having a ratio of formaldehyde to phenol of greater than or equal to one, typically from 1:1 to 3:1.

Optionally, but typically, the curable composition further includes one or more catalysts and/or curing agents to initiate and/or accelerate the curing process (e.g., thermal catalyst, hardener, crosslinker, photocatalyst, thermal initiator, and/or photoinitiator). Exemplary acidic catalysts suitable for curing phenolic resins include sulfuric, hydrochloric, phosphoric, oxalic, and p-toluenesulfonic acids. Alkaline catalysts suitable for curing phenolic resins include sodium hydroxide, barium hydroxide, potassium hydroxide, calcium hydroxide, organic amines, or sodium carbonate.

Phenolic resins are well-known and readily available from commercial sources. Examples of commercially available novolac resins include: those marketed under the trade designations DUREZ and VARCUM by Sumitomo Bakelite North America, Inc./Durez Corp. of Novi, Mich.; or those marketed under the trade designations BAKELITE, CELLOBOND, RUTAPHEN, or DURITE by Hexion Specialty Chemicals, Inc. of Columbus, Ohio. Examples of commercially available resole phenolic resins useful in practice of the present disclosure include those marketed by Durez Corporation under the trade designation VARCUM; those marketed by Ashland Chemical Co. of Bartow, Fla. under the trade designation AEROFENE; those marketed by Kangnam Chemical Company Ltd. of Seoul, South Korea under the trade designation PHENOLITE; and resole phenolic resins marketed by Georgia-Pacific, Atlanta, Ga. Further details concerning suitable phenolic resins may be found, for example, in U.S. Pat. No. 5,591,239 (Larson et al.) and U.S. Pat. No. 5,178,646 (Barber, Jr. et al.).

Other additives such as fillers, thickeners, tougheners, grinding aids, pigments, fibers, tackifiers, lubricants, wetting agents, surfactants, antifoaming agents, dyes, plasticizers, suspending agents, bactericides, fungicides, grinding aids, and antistatic agents may also be included in the curable composition. The curable composition may further include non-isocyanate-functionalized abrasive particles; however, this is typically not desired.

The isocyanate-modified abrasive particles may be prepared by chemically modifying the surface of an abrasive particle with an organosilane containing an isocyanato group. Preferably, the isocyanate-functionalized organosilane is represented by the formula

$$O=C=N-Z-SiY_3$$

Z represents an alkylene group having from 1 to 6 carbon atoms (e.g., methylene, ethylene, propylene, butylene, pentylene, hexylene) and may be linear, branched, or cyclic. Each Y independently represents a hydrolyzable group.

The term 'hydrolyzable group', as used herein, denotes a group that can be hydrolyzed, which means it can react with water to provide silanol groups (Si—OH groups) that can further react with groups (e.g., hydroxyl groups) on the surfaces of the abrasive particles. The hydrolysis and condensation reactions may occur spontaneously and/or in the presence of a hydrolysis/condensation catalyst. Examples of hydrolyzable groups include halide groups, such as chlorine, bromine, iodine or fluorine, alkoxy groups (—OR' wherein R' represents an alkyl group, preferably containing 1 to 6, more preferably 1 to 4 carbon atoms, and which may optionally be substituted by one or more halogen atoms), acyloxy groups (—O—(C=O)—R" wherein R" is as defined for R'), aryloxy groups (—OR''' wherein R''' represents an aryl moiety, preferably containing 6 to 12, more preferably containing 6 to 10 carbon atoms, which may be optionally substituted by one or more substituents independently selected from halogens and $C_1$-$C_4$ alkyl groups which may optionally be substituted by one or more halogen atoms). In the above formulae, R', R", and R''' may include branched structures.

In some embodiments, preferred hydrolyzable groups Y include methoxy and ethoxy groups. Particularly, preferred isocyanate-functionalized organosilanes include 3-isocyanatopropyltrimethoxysilane, 3-isocyanatopropyltriethoxysilane, 2-isocyanatoethyltrimethoxysilane, and 2-isocyanatoethyltriethoxysilane.

The amount of organosilane containing an isocyanato group (which may function as a coupling agent) that should be added to the abrasive particles will generally depend to a degree on the surface area of the abrasive particles. Preferably, it is added at a level that results in monolayer coverage of the surface of the abrasive particles; however, this is not a requirement. In some embodiments, the amount of the organosilane containing an isocyanato group that is added to the abrasive particles is less than or equal to 0.005 wt. percent, preferably less than or equal to 0.003 wt. percent, and more preferably less than or equal to 0.002 wt. percent, based on the total weight of abrasive particles and organosilane containing an isocyanato group.

In general, the abrasive particle(s) should have a surface that is reactive to the isocyanate-functionalized organosilane, preferably through the silyl moiety (e.g., by hydrolysis).

Useful abrasive particles include, for example, crushed particles of fused aluminum oxide, heat treated aluminum oxide, white fused aluminum oxide, ceramic aluminum oxide materials such as those commercially available under the trade designation 3M CERAMIC ABRASIVE GRAIN from 3M Company of St. Paul, Minn., black silicon carbide, green silicon carbide, titanium diboride, boron carbide, tungsten carbide, titanium carbide, diamond, cubic boron nitride, garnet, fused alumina zirconia, sol-gel derived abrasive particles, iron oxide, chromia, ceria, zirconia, titania, silicates, tin oxide, silica (such as quartz, glass beads, glass bubbles and glass fibers) silicates (such as talc, clays (e.g., montmorillonite), feldspar, mica, calcium silicate, calcium metasilicate, sodium aluminosilicate, sodium silicate), flint, or emery. Examples of sol-gel derived crushed abrasive particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the abrasive particles could comprise vitreous abrasive agglomerates such, for example, as those described in U.S. Pat. No. 7,887,608 (Schwabel et al.).

Further details concerning methods of making sol-gel-derived abrasive particles can be found in, for example, U.S. Pat. No. 4,314,827 (Leitheiser); U.S. Pat. No. 5,152,917 (Pieper et al.); U.S. Pat. No. 5,213,591 (Celikkaya et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. Publ. Pat. Appln. Nos. 2009/0165394 A1 (Culler et al.) and 2009/0169816 A1 (Erickson et al.).

The abrasive particles may be shaped (i.e., having a nonrandom shape imparted by the method of their manufacture). For example, shaped abrasive particles may be prepared by a molding process using sol-gel technology as described in U.S. Pat. No. 5,201,916 (Berg); U.S. Pat. No. 5,366,523 (Rowenhorst (U.S. Pat. No. Re 35,570)); and U.S. Pat. No. 5,984,988 (Berg). U.S. Pat. No. 8,034,137 (Erickson et al.) describes alumina abrasive particles that have been formed in a specific shape, then crushed to form shards that retain a portion of their original shape features. In some embodiments, shaped alpha alumina particles are precisely-shaped (i.e., the particles have shapes that are at least partially determined by the shapes of cavities in a production tool used to make them. Details concerning such abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris).

Suitable abrasive particles may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F16, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the abrasive particles can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the crushed abrasive particles pass through a test sieve meeting ASTM E-11 specifications for the number 18 sieve and are retained on a test sieve meeting ASTM E-11 specifications for the number 20 sieve. In one embodiment, the crushed abrasive particles have a particle size such that most of the particles pass through an 18 mesh test sieve and can be retained on a 20, 25, 30, 35, 40, 45, or 50 mesh test sieve. In various embodiments, the crushed abrasive particles can have a nominal screened grade of: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size can be used such as −90+100.

Reaction of the isocyanate-functional organosilane with the abrasive particle is preferably carried out under conditions such that the hydrolyzable groups are removed by hydrolysis and then condensed with the abrasive particle at its surface to form 1, 2, or preferably 3 covalent bonds, thereby anchoring the isocyanato (i.e., O=C=N—) group firmly to the abrasive particle. Conditions for carrying out such reactions are well-known to those of skill in the art. In some cases, simple mixing may be sufficient. Preferably, the isocyanate-functional organosilane is combined with the abrasive particles in sufficient amount that substantially the entire surface of the abrasive particles becomes modified by reaction with the isocyanate-functional organosilane, although this is not a requirement. For example, the isocyanate-functional organosilane may be used in an amount of 0.01 to 3 parts by weight, preferably 0.1 to 0.3 parts by weight, for every 100 parts by weight of abrasive particles, although amounts outside this range may also be used.

The curable composition typically comprises the phenolic resin in an amount of amount of from 5 to 30 percent by weight, more typically 10 to 25 percent by weight, and more typically 15 to 24 percent by weight, based on the total weight of the cured composition (e.g., in a bonded abrasive), although other amounts may be used.

Curable compositions according to the present disclosure can be cured and included in various abrasive articles such as bonded abrasive articles.

Referring now to FIG. 1, exemplary resin bond abrasive cut-off wheel 100 according to one embodiment of the present disclosure has center hole 112 used for attaching cut-off wheel 100 to, for example, a power driven tool (not shown). Cut-off wheel 100 includes abrasive particles (e.g., shaped and/or crushed abrasive particles surface-treated with an isocyanate-functional organosilane and subsequently reacted with the phenolic resin according to the present disclosure) and phenolic binder material 25.

Figure 2:
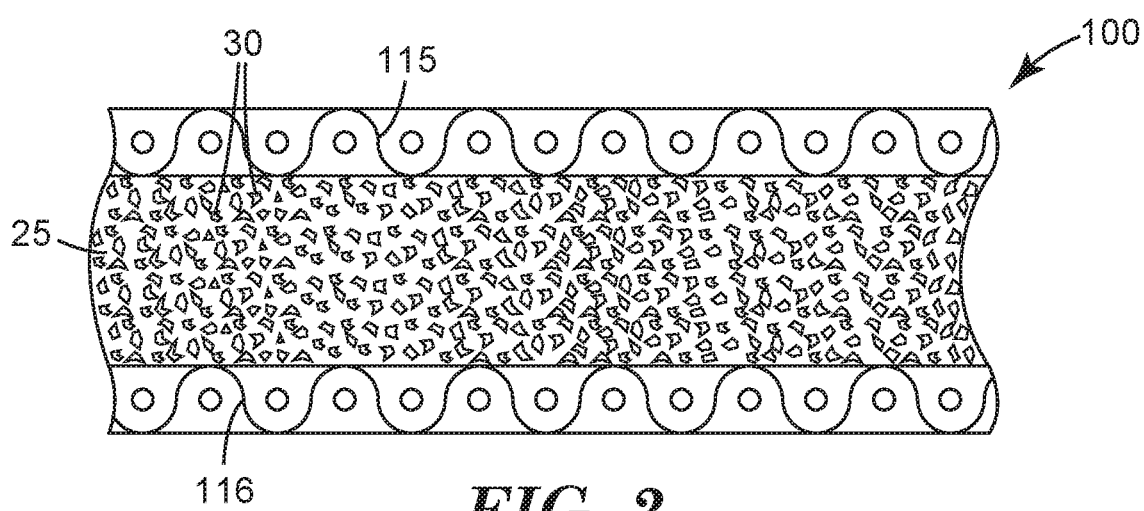
FIG. 2 is a schematic cross-sectional side view of exemplary bonded abrasive wheel 100 shown in FIG. 1 taken along line 2-2.

Referring now to FIG. 2, cut-off wheel 100 includes abrasive particles (e.g., shaped and/or crushed abrasive particles) 30, and phenolic binder material 25. Cut-off wheel 100 has optional first scrim 115 and optional second scrim 116, which are disposed on opposed major surfaces of cut-off wheel 100.

Bonded abrasive articles (e.g., grinding wheels and cut-off wheels) according to the present disclosure are generally made by a molding process. During molding, the curable composition is mixed with the abrasive particles. In some instances, a liquid medium (either resin or a solvent) is first applied to the abrasive particles to wet their outer surface, and then the wetted particles are mixed with a powdered medium. Bonded abrasive articles (e.g., abrasive wheels) according to the present disclosure may be made by compression molding, injection molding, transfer molding, or the like. The molding can be done either by hot or cold pressing or any suitable manner known to those skilled in the art.

Catalysts and/or initiators may be included in the curable composition. Typically, heat is applied to advance curing of the curable composition; however, other sources of energy (e.g., microwave radiation, ultraviolet light, visible light, may also be used. The specific curatives and amounts used will be apparent to those skilled in the art.

Curing temperature and pressure will vary with the curable composition and the abrasive article design. Selection of suitable conditions is within the capability of one of ordinary skill in the art. Exemplary conditions for a phenolic binder may include an applied pressure of about 20 tons per 4 inches diameter (244 kg/cm$^2$) at room temperature followed by heating at temperatures up to about 185° C. for sufficient time to cure the curable composition.

In some embodiments, bonded abrasive articles according to the present disclosure include from about 10 to about 65 percent by weight of abrasive particles, typically 30 to 60 percent by weight, and more typically 40 to 60 percent by weight, based on the total weight of the bonded abrasive article. Preferably, at least 50 percent by weight, more preferably at least 80 percent by weight, and more preferably at least 95 percent by weight, or even all of the abrasive particles contained in bonded abrasive articles (or any other abrasive article) according to the present disclosure are derived from isocyanate-modified abrasive particles that have reacted with the phenolic resin during cure, and hence are covalently bonded to the cured phenolic binder matrix.

In some embodiments, bonded abrasive articles according to the present disclosure contain additional grinding aids such as, for example, polytetrafluoroethylene particles, cryolite, sodium chloride, FeS$_2$ (iron disulfide), or KBF$_4$; typically in amounts of from 1 to 25 percent by weight, more typically 10 to 20 percent by weight, subject to weight range requirements of the other constituents being met. Grinding aids are added to improve the cutting characteristics of the cut-off wheel, generally by reducing the temperature of the cutting interface. The grinding aid may be in the form of single particles or an agglomerate of grinding aid particles. Examples of precisely shaped grinding aid particles are taught in U.S. Patent Publ. No. 2002/0026752 A1 (Culler et al.).

In some embodiments, the curable composition (and/or the corresponding cured composition) contains plasticizer such as, for example, that available as SANTICIZER 154 PLASTICIZER from UNIVAR USA, Inc. of Chicago, Ill.

In some embodiments, the curable composition (and/or the corresponding cured composition) contains filler particles, subject to weight range requirements of the other constituents being met. Filler particles may be added to occupy space and/or provide porosity. Porosity enables the resin bond abrasive article to shed used or worn abrasive particles to expose new or fresh abrasive particles. Bonded abrasive articles (e.g., wheels) according to the present disclosure have any range of porosity; for example, from about 1 percent to 50 percent, typically 1 percent to 40 percent by volume. Examples of fillers include bubbles and beads (e.g., glass, ceramic, clay, polymeric, metal), cork, gypsum, marble, limestone, aluminum silicate, and combinations thereof.

To manufacture a bonded abrasive article (e.g., a wheel), the curable mixture is pressed into a mold (e.g., at an applied pressure of 20 tons per 4 inches diameter (244 kg/cm$^2$) at room temperature. The molded wheel is then cured by heating at temperatures up to about 185° C. for sufficient time to cure the curable phenolic resin.

Bonded abrasive articles according to the present disclosure may be useful, for example, as cut-off wheels and abrasives industry Type 27 (e.g., as in American National Standards Institute standard ANSI B7.1-2000 (2000) in section 1.4.14) depressed-center grinding wheels.

Cut-off wheels are typically 0.80 millimeter (mm) to 16 mm in thickness, more typically 1 mm to 8 mm, and typically have a diameter between 2.5 cm and 100 cm (40 inches), more typically between about 7 cm and 13 cm, although other dimensions may also be used (e.g., wheels as large as 100 cm in diameter are known). An optional center hole may be used to attaching the cut-off wheel to a power driven tool. If present, the center hole is typically 0.5 cm to 2.5 cm in diameter, although other sizes may be used. The optional center hole may be reinforced; for example, by a metal flange. Alternatively, a mechanical fastener may be axially secured to one surface of the cut-off wheel. Examples include threaded posts, threaded nuts, Tinnerman nuts, and bayonet mount posts.

Optionally, bonded abrasive articles, especially cut-off wheels, according to the present disclosure may further comprise a scrim and/or backing that reinforces the resin bond abrasive wheel; for example, disposed on one or two major surfaces of the resin bond abrasive wheel, or disposed within the resin bond abrasive wheel. Examples include paper, polymeric film, metal foil, vulcanized fiber, synthetic fiber and/or natural fiber nonwovens (e.g., lofty open nonwoven synthetic fiber webs and meltspun scrims), synthetic and/or natural fiber knits, synthetic fiber and/or natural fiber wovens (e.g., woven glass fabrics/scrims, woven polyester fabrics, treated versions thereof, and combinations thereof). Examples of suitable porous reinforcing scrims include porous fiberglass scrims and porous polymeric scrims (e.g., comprising polyolefin, polyamide, polyester, cellulose acetate, polyimide, and/or polyurethane) which may be melt-spun, melt blown, wet-laid, or air-laid, for example. In some instances, it may be desirable to include reinforcing staple fibers within the bonding medium, so that the fibers are homogeneously dispersed throughout the cut-off wheel.

The selection of porosity and basis weight of the various reinforcing members (e.g., scrims and backings) described herein are within the capability of those skilled in the abrasives art, and typically depend on the intended use.

Bonded abrasive articles according to the present disclosure are useful, for example, for abrading a workpiece. For example, they may be formed into grinding or cut-off wheels that exhibit good grinding characteristics while maintaining a relatively low operating temperature that may avoid thermal damage to the workpiece.

Cut-off wheels can be used on any right angle grinding tool such as, for example, those available from Ingersoll-Rand, Sioux, Milwaukee, and Dotco. The tool can be electrically or pneumatically driven, generally at speeds from about 1000 to 50000 RPM.

During use, the resin bond abrasive wheel can be used dry or wet. During wet grinding, the wheel is used in conjunction with water, oil-based lubricants, or water-based lubricants. Bonded abrasive articles according to the present disclosure may be particularly useful on various workpiece materials such as, for example, carbon steel sheet or bar stock and more exotic metals (e.g., stainless steel or titanium), or on softer more ferrous metals (e.g., mild steel, low alloy steels, or cast iron).

Curable compositions according to the present disclosure can also be cured and included in abrasive articles such as coated abrasive articles and nonwoven abrasive articles, for example.

Details concerning manufacture of coated abrasive articles can be found, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,417,726 (Stout et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,954,844 (Law et al.); U.S. Pat. No. 5,961,674 (Gagliardi et al.); U.S. Pat. No. 4,751,138 (Bange et al.); U.S. Pat. No. 5,766,277 (DeVoe et al.); and U.S. Pat. No. 6,228,133 (Thurber et al.).

Further details concerning nonwoven abrasive articles and methods for their manufacture may be found, for example, in U.S. Pat. No. 2,958,593 (Hoover et al.); U.S. Pat. No. 4,991,362 (Heyer et al.); U.S. Pat. No. 5,554,068 (Can et al.); U.S. Pat. No. 5,712,210 (Windisch et al.) U.S. Pat. No. 5,591,239 (Larson et al.); U.S. Pat. No. 5,681,361 (Sanders); U.S. Pat. No. 5,858,140 (Berger et al.); U.S. Pat. No. 5,928,070 (Lux); U.S. Pat. No. 6,017,831 (Beardsley et al.); U.S. Pat. No. 6,207,246 (Moren et al.); and U.S. Pat. No. 6,302,930 (Lux).

Objects and advantages of this disclosure are further illustrated by the following non-limiting examples, but the particular materials and amounts thereof recited in these examples, as well as other conditions and details, should not be construed to unduly limit this disclosure.

Select Embodiments of the Present Disclosure

In a first embodiment, the present disclosure provides a curable composition comprising a phenolic resin and isocyanate-functionalized abrasive particles, wherein the isocyanate-functionalized abrasive particles consist of the reaction product of at least one isocyanate-functional organosilane and abrasive particles.

In a second embodiment, the present disclosure provides a curable composition according to the first embodiment, wherein the abrasive particles comprise alpha alumina.

In a third embodiment, the present disclosure provides a curable composition according to the first or second embodiment, wherein the isocyanate-functional organosilane is represented by the formula O=C=N—Z—SiY$_3$, wherein Z represents an alkylene group having from 1 to 6 carbon atoms, and each Y independently represents a hydrolyzable group.

In a fourth embodiment, the present disclosure provides a curable composition according to any one of the first to third embodiments, wherein the at least one isocyanate-functional organosilane comprises at least one 3-isocyanatopropyltrialkoxysilane.

In a fifth embodiment, the present disclosure provides a curable composition according to any one of the first to fourth embodiments, wherein the at least one isocyanate-functional organosilane comprises at least one of 3-isocyanatopropyltriethoxysilane and 3-isocyanatopropyltrimethoxysilane.

In a sixth embodiment, the present disclosure provides a method of making an abrasive article, the method comprising at least partially curing a curable composition, wherein the curable composition comprises a phenolic resin and isocyanate-functionalized abrasive particles, wherein the isocyanate-functionalized abrasive particles consist of the reaction product of at least one isocyanate-functional organosilane and abrasive particles.

In a seventh embodiment, the present disclosure provides a method of making an abrasive article according to the sixth embodiment, wherein the abrasive particles comprise alpha alumina.

In an eighth embodiment, the present disclosure provides a method of making an abrasive article according to the sixth or seventh embodiment, wherein the isocyanate-functional organosilane is represented by the formula O=C=N—Z—SiY$_3$, wherein Z represents an alkylene group having from 1 to 6 carbon atoms, and each Y independently represents a hydrolyzable group.

In a ninth embodiment, the present disclosure provides a method of making an abrasive article according to any one of the sixth to eighth embodiments, wherein the at least one isocyanate-functional organosilane comprises at least one 3-isocyanatopropyltrialkoxysilane.

In a tenth embodiment, the present disclosure provides a method of making an abrasive article according to any one of the sixth to ninth embodiments, wherein the at least one isocyanate-functional organosilane comprises at least one of 3-isocyanatopropyltriethoxysilane and 3-isocyanatopropyltrimethoxysilane.

In an eleventh embodiment, the present disclosure provides an abrasive article comprising abrasive particles retained in a binder, wherein the binder comprises a cured curable composition, wherein the curable composition comprises a phenolic resin and isocyanate-functionalized abrasive particles, and wherein the isocyanate-functionalized abrasive particles consist of the reaction product of at least one isocyanate-functional organosilane and abrasive particles.

In a twelfth embodiment, the present disclosure provides an abrasive article according to the eleventh embodiment, wherein the abrasive article comprises a bonded abrasive article.

In a thirteenth embodiment, the present disclosure provides an abrasive article according to the eleventh or twelfth embodiment, wherein the bonded abrasive article comprises a bonded abrasive wheel.

In a fourteenth embodiment, the present disclosure provides an abrasive article according to any one of the eleventh to thirteenth embodiments, wherein the abrasive particles comprise alpha alumina.

In a fifteenth embodiment, the present disclosure provides an abrasive article according to any one of the eleventh to fourteenth embodiments, wherein the at least one isocyanate-functional organosilane comprises at least one of 3-isocyanatopropyltriethoxysilane and 3-isocyanatopropyltrimethoxysilane.

In a sixteenth embodiment, the present disclosure provides an abrasive article according to any one of the eleventh to fourteenth embodiments, wherein the isocyanate-functional organosilane is represented by the formula O=C=N—Z—SiY$_3$, wherein Z represents an alkylene group having from 1 to 6 carbon atoms, and each Y independently represents a hydrolyzable group.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. In the examples, grams is abbreviated as "g", and wt. % means weight percent based on total weight unless otherwise specified.

Table 1, below, lists various materials used in the examples.

TABLE 1

| ABBREVIATION | DESCRIPTION |
| --- | --- |
| AlOxSub | alumina (Al$_2$O$_3$) substrate dimensions 114.3 cm × 114.3 cm × 1.0 cm (4.50 in × 4.50 in × 0.040 in) from Coorstek Operations, Grand Junction, CO |
| AP1 through AP4 | adhesion promoters, prepared according to Adhesion Promoter Preparation, described below. |
| APTES | (3-Aminopropyl)triethoxysilane from Gelest, Inc., Morrisville, Pennsylvania |
| BTESPA | bis[3-(triethoxysilyl)propyl]amine from Gelest, Inc., Morrisville, Pennsylvania |
| CAT1 | di-n-butyltin dilaurate (CAS#77-58-7) obtained from Alfa Aesar, Ward Hill, Massachusetts |
| TESPIS | 3-(triethoxysilyl)propyl isocyanate obtained from Gelest, Inc., Morrisville, Pennsylvania |

TABLE 1-continued

| ABBREVIATION | DESCRIPTION |
|---|---|
| PO | paraffin oil (CAS#8012-95-1) |
| PP | a mixture of 39.4 wt. % of novolac phenolic resin (obtained as HEXION 0224P from Momentive Specialty Chemicals Columbus, Ohio), 8.2 wt. % of ZWSK F400 (obtained from Imerys Villach, Austria), 0.4 wt. % of carbon black (obtained as LUVOMAXXX LB/S from Lehmann & Voss & Co. KG Hamburg, Germany), and 52.0 wt. % of PAF (potassium aluminum fluoride from KBM Affilips Master Alloys, Delfzijl, Netherlands) |
| RP | liquid phenolic resin obtained as PREFERE 92 5136G1 from Dynea Erkner GmbH, Erkner, Germany |
| SAP | alpha alumina abrasive particles shaped as truncated triangular pyramids with equal base side lengths of 0.84 mm, a height of 0.168 mm, and a sidewall inward taper angle of 8 degrees (i.e., the dihedral angle between any sidewall and the base is nominally 82 degrees) and having a surface coating of fine alumina particles; prepared as described hereinbelow |
| SCRIM1 | fiberglass mesh, obtained as "RXO 08-125 × 23 mm" from Rymatex Sp. Zo.o., Rymanów, Poland |
| SCRIM2 | fiberglass mesh scrim attached to a cloth mesh, obtained as "RXV 08-125 × 23 mm" from Rymatex Sp. zo.o, Rymanów, Poland |
| ACE | Acetone, obtained from Sigma Aldrich, St. Louis, Missouri |
| TOL | Toluene, obtained from Sigma Aldrich, St. Louis, Missouri |

Preparation of Abrasive Particles SAP

Precisely-shaped alpha alumina abrasive particles SAP in the examples were prepared according to the disclosure of Example 1 of U.S. Pat. No. 8,142,531 (Adefris et al.) by molding alumina sol-gel in equilateral triangular polypropylene mold cavities. Further, SAP had a coating of fine (about 0.5 micron) particles of alumina (HYDRAL COAT 5, obtained from Almatis, Pittsburgh, Pa.), this particle coating was applied according to the method of U.S. Pat. No. 5,213,591 (Celikkaya, et al.).

Adhesion Promoter Preparation

AP1

Silane condensation catalyst, CAT1, was incorporated in APTES at 1 part CAT1 for 100 parts of APTES. TOL was added and mixed thoroughly to create a 5 wt. % solid solution.

AP2

Silane condensation catalyst, CAT1, was incorporated in BTESPA at 1 part CAT1 for 100 parts of BTESPA for fast curing. TOL was added and mixed thoroughly to create a 5 wt. % solid solution.

AP3

Silane condensation catalyst, CAT1, was incorporated in TESPIS at 1 part CAT1 for 100 parts of TESPIS. TOL was added and mixed thoroughly to create a 5 wt. % solid solution.

AP4

Silane condensation catalyst, CAT1, was incorporated in TESPIS at 1 part CAT1 for 100 parts of TESPIS. ACE was added and mixed thoroughly to create a 5 wt. % solid solution.

Example 1

Laser-cut alumina substrates, AlOxSub, were cut in half by using a diamond cutter to make substrates with dimensions of 57.15 cm×114.3 cm×1.0 cm (2.25 in×4.50 in×0.040 in). A cut alumina substrate was weighed with a balance (to the nearest 0.01 g), weight A. The weighed substrate was cleaned with a brush and adhesion promoter AP1 was applied on the surface by using a Mayer rod coater (RDS36 wire size coater) to create a wet thickness layer of 82.3 μm depth. The adhesion promoter treated alumina substrates were dried in a convection oven at 65° C. for 30 minutes.

In a 1000 mL beaker, 100 g of SAP was measured. Prepared adhesion promoter solution AP1 was applied evenly on the grain surface using a spray coater (Prevail, Coal City, Ill.) while shaking the beaker to prevent uneven coating and grain coagulation. Enough AP1 solution was sprayed to create a coating of 0.1 wt. % APTES. When all coating solution was applied, the beaker continued to be shaken for uniform coating until the grain dried. When the grain is visually dry, it was further dried in an oven at 65° C. for 30 min.

RP was introduced to room temperature at least 20 min before use to reduce its viscosity from storage at 9° C. RP was applied on the AP1 treated AlOxSub with a Mayer rod coater without dilution. A RDS36 wire size coater was used which resulted in a RP wet thickness of 82.3 μm.

AP1 treated SAP (12 g) was placed in a modified aluminum weighing pan and was evenly sprinkled on the RP and AP1 coated AlOxSub by gently tapping the aluminum pan. Sprinkling speed and amount was adjusted by varying tapping speed and aluminum pan holding angle. The prepared samples were cured in an oven for 1 to 2 hours at 70° C., followed by 1 to 2 hours at 100° C., followed by 1 to 2 hours at 140° C., followed by 22 to 26 hours at 188° C. Then the prepared samples were cooled for 1 to hours at 100° C., followed by 1 to 2 hours at 50° C.

Two samples were made for rub testing.

Example 2

Example 1 was repeated except the SAP was treated with AP1 to create a coating of 0.3 wt. % APTES.

Example 3

Example 1 was repeated except the AlOxSub was coated with AP2 and the SAP was treated with AP2 to create a coating of 0.3 wt. % BTESPA.

Example 4

Example 1 was repeated except the AlOxSub was coated with AP3 and the SAP was treated with AP3 to create a coating of 0.1 wt. % TESPIS.

Example 5

Example 4 was repeated except the SAP was treated with AP3 to create a coating of 0.3 wt. % TESPIS.

Comparative Example A

Example 1 was repeated except that adhesion promoter was not applied to the AlOxSub and was not coated on the SAP.

Two samples from Example 1-5 and Comparative Example A were analyzed by the rubbing test method described below and the results are recorded in Tables 2 and 3.

Rubbing Test Method

Any portion of the SAP that was completely unbound or very weakly bound to the substrate was removed by rubbing the sample surface with a piece of relatively soft rubber mat. After the pre-rubbing, the sample was thoroughly cleaned by blowing air to remove any remaining loose particles. When pre-rubbing was completed, each sample was weighed with a balance (to the nearest 0.01 g) and recorded as weight B Weight $B$=AlOxSub+RP+bound SAP Weight $B$=Weight $A$+RP+bound SAP Pre-rubbed substrates were then placed in an aluminum tray and deionized (DI) water was poured on the samples to soak them. The amount of DI water for the soaking was enough to completely submerge the samples. The soaking process was continued for 24 hours at room temperature. The samples were removed from the water after 24 hours and the wet samples were dried by dabbing them with paper towels and then blowing them with an air gun for at least 1 minute.

An alumina blade (AlOxSub cut to 57.15 cm×114.3 cm×1.0 cm (2.25 in×4.50 in×0.040 in) was angled at a 45 degree angle to the sample and rubbed down the length of the sample. The weight applied to the blade was kept constant at 2250 g±250 g. During the rubbing process, weakly bound grain was detached from the sample. After two traversed rubs by the alumina blade, the sample surface was carefully cleaned with a brush to remove detached/loose grain and the weight of the sample was recorded as Weight C. The rubbing and cleaning process was repeated two more times (for a total of four rubs) and the weight of the sample was recorded as Weight D. The rubbing and cleaning process was repeated two more times (for a total of six rubs) and the weight of the sample was recorded as Weight E. The rubbing and cleaning process was repeated two more times (for a total of eight rubs) and the weight of the sample was recorded as Weight F. The rubbing and cleaning process was repeated two more times (for a total of ten rubs) and the weight of the sample was recorded as Weight G.

Weights A to G are in Table 2 for Example 1-5 and Comparative Example A.

Table 3 reports the percent grain weight retention as a function of rub for Example 1-5 and Comparative Example A. The percent grain weight retention is calculated as:

$$\text{Grain Weight Retention}(\%) = \frac{\text{Weight } B, C, D, E, F \text{ or } G - \text{Weight } A}{\text{Weight } B - \text{Weight } A} \times 100$$

TABLE 2

| EXAMPLE | Weight A | Weight B | Weight C | Weight D | Weight E | Weight F | Weight G |
|---|---|---|---|---|---|---|---|
| 1 | 24.52, 25.28 | 29.96, 30.91 | 28.19, 29.37 | 27.01, 28.02 | 25.96, 27.01 | 25.59, 26.83 | 25.41, 26.48 |
| 2 | 25.25, 25.00 | 30.72, 30.75 | 29.31, 29.16 | 28.26, 27.99 | 27.48, 27.08 | 27.12, 26.73 | 26.86, 26.48 |
| 3 | 25.18, 24.96 | 31.83, 31.77 | 30.07, 29.68 | 28.78, 28.43 | 27.42, 27.22 | 26.53, 26.44 | 26.11, 25.88 |
| 4 | 24.38, 25.08 | 30.79, 30.37 | 29.58, 28.78 | 28.70, 27.61 | 28.06, 26.99 | 27.74, 26.57 | 27.49, 26.36 |
| 5 | 24.76, 25.01 | 30.22, 30.97 | 28.72, 29.46 | 27.78, 28.27 | 27.16, 27.63 | 26.83, 27.34 | 26.54, 27.14 |
| Comp. Ex. A | 25.26, 24.65 | 33.21, 33.38 | 31.56, 31.43 | 29.69, 29.8 | 27.16, 28.40 | 26.05, 26.71 | 25.66, 25.75 |

TABLE 3

| | Grain Weight Retention [%] after # of Rubbing | | | | | |
|---|---|---|---|---|---|---|
| EXAMPLE | 0 | 2 | 4 | 6 | 8 | 10 |
| 1 | 100, 100 | 67, 73 | 46, 49 | 26, 31 | 20, 28 | 16, 21 |
| 2 | 100, 100 | 74, 72 | 55, 52 | 41, 36 | 34, 30 | 29, 26 |
| 3 | 100, 100 | 74, 69 | 54, 51 | 34, 33 | 20, 22 | 14, 14 |
| 4 | 100, 100 | 81, 70 | 67, 48 | 57, 36 | 52, 28 | 49, 24 |
| 5 | 100, 100 | 73, 75 | 55, 55 | 44, 44 | 38, 39 | 33, 36 |
| Comp. Ex. A | 100, 100 | 79, 78 | 56, 59 | 24, 43 | 10, 24 | 5, 13 |

Examples 4 and 5 with the isocyanate-functional silane have better adhesion between the inorganic alumina grain and the organic phenolic resin than the amino-functional silane treatment alone. This is demonstrated by the higher retention of grain.

Example 6

In a beaker, 100 g of SAP was placed. Then, 2.0 g of the prepared adhesion promoter solution AP4 was applied evenly on the grain surface using a spray coater (Prevail, Coal City, Ill.) while shaking the beaker to prevent uneven coating and grain coagulation. Once the spray process was finished, the beaker was continuously agitated at room temperature until the coated particle surfaces became dry.

When the grain was visually dry, it was further dried in an oven at 65° C. for 30 min. The prepared grain was kept in plastic bags or glass jars before cut-off wheel preparation. The process was repeated six times to product 600 g 0.1 wt. % TESPIS coated SAP.

RP (60 g) was added to 600 g 0.1 wt. % AP4 coated SAP, and the combination was mixed in a KitchenAid Commercial mixer (Model KSM C505) for 7 minutes at speed 1. This mixture was then combined with 340 g of PP and mixed for an additional 7 minutes. In the middle of the second mixing step, 5 mL PO was added to the mixture.

Comparative Example B

Example 6 was repeated, except the abrasive grains used were 600 g of SAP without any treatment.

Example 7

Example 6 was repeated, except the abrasive grain was coated with AP4 to create a coating of 0.3 wt. % TESPIS.

Preparation of Abrasive Articles

The mixes of Examples 6-7 and Comparative Example B were left to sit in ambient conditions for 20 hrs. Next, each mixture was sieved through a 12-mesh screen (+12/pan) to remove agglomerates. A 125 mm diameter disc of SCRIM2 was placed in the bottom of a 125-mm diameter mold cavity. The mold had an inner diameter of 23 mm. A fill mixture (27.5 g) from Example 1 was spread on top of the SCRIM2. SCRIM1 was then placed on top of the fill mixture and a small diameter experimental label was placed on top of the scrim. A metal flange 28 mm×22.45 mm×1.2 mm from Lumet PPUH in Jaslo, Poland was placed on top of each label. The mold was closed and the scrim-fill-scrim sandwich was pressed at a load of pressed 30 tons (244.5 kg/cm²) at room temperature for 3 sec. Six wheels were made from each mix. After pressing, the cut-off wheel precursors were then removed from the mold and were placed on a stacks between aluminum plates and PTFE sheets in order to keep the shape during the curing program. The wheels were cured in a stack with a 30 hr cure cycle: 2 hr to 75° C., 2 hr to 90° C., 5 hr to 110° C., 3 hr to 135° C., 3 hr to 188° C., 13 hr at 188° C., and a then 2 hr cool-down to 60° C. The final thickness of the wheel was approximately 0.053 inch (1.35 mm).

Cutting Test Method

A 40-inch (101.6-cm) long sheet of ⅛ inch (3.2 mm) thick stainless steel was secured with its major surface inclined at a 35-degree angle relative to horizontal. A guide rail was secured along the downward-sloping top surface of the inclined sheet. A DeWalt Model D28114 4.5-inch (11.4-cm)/5-inch (12.7-cm) cut-off wheel angle grinder was secured to the guide rail such that the tool was guided in a downward path under the force of gravity.

A cut-off wheel for evaluation was mounted on the tool such that the cut-off wheel encountered the full thickness of the stainless steel sheet when the cut-off wheel tool was released to traverse downward, along the rail under gravitational force. The cut-off wheel tool was activated to rotate the cut-off wheel at 10000 rpm, the tool was released to begin its descent, and the length of the resulting cut in the stainless steel sheet was measured after 60 seconds (One Minute Cut). Dimensions of the cut-off wheel were measured before and after the cutting test to determine wear. Three cut-off wheels from Examples 6-7 and Comparative Example B were tested as-made, and also after 10 days of aging in a 90% RH and 90° F. (32° C.) environmental chamber and then conditioning of 2 hours at 50° C.

One minute cut was measured as the distance that the cutting wheel abraded through the stainless steel sheet in one minute. The wear rate is the loss of wheel volume as a function of the time the wheel cut. The engineering performance, is the length of the cut multiplied by the wheel thickness and then divided by the change in mass of the wheel. Results of the Cutting Test for Examples 6-7 and Comparative Example B are reported in Table 4, below.

TABLE 4

| EXAMPLE | ONE MINUTE CUT, mm | | WEAR RATE, mm³/min | | ENGINEERING PERFORMANCE, mm²/g | |
|---|---|---|---|---|---|---|
| | As-Made (average) | Aged (average) | As-Made (average) | Aged (average) | As-Made (average) | Aged (average) |
| Comparative Example B | 1172, 1172, 1129 (1158) | 992, 978, 934 (968) | 5038, 4536, 5889 (5154) | 5510, 5402, 5748 (5553) | 173.6, 184.2, 140.4 (166.1) | 128.9, 128.4, 126.3 (127.9) |
| 6 | 1219, 1150, 1195 (1188) | 1033, 1051, 998 (1027) | 4635, 4994, 5248 (4959) | 4860, 5131, 4917 (4969) | 193.4, 169.1, 154.3 (172.3) | 147.0, 142.6, 145.9 (145.1) |
| 7 | 1172, 1172, 1150 (1165) | 813, 854, 835 (834) | 5520, 5140, 5412 (5357) | 6070, 5637, 5807 (5838) | 162.4, 161.0, 145.5 (156.3) | 117.9, 131.8, 128.3 (126.0) |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An abrasive article comprising abrasive particles retained in a binder, wherein the binder comprises a cured curable composition, wherein the curable composition comprises a phenolic resin and isocyanate-functionalized abrasive particles, wherein the isocyanate-functionalized abrasive particles consist of the reaction product of at least one isocyanate-functional organosilane and abrasive particles, and wherein the abrasive article comprises a bonded abrasive wheel, wherein the at least one isocyanate-functional organosilane is present in a weight ratio of 0.01 to 0.1 parts by weight per 100 parts by weight of the abrasive particles.

2. The abrasive article of claim 1, wherein the abrasive particles comprise alpha alumina.

3. The abrasive article of claim 1, wherein the at least one isocyanate-functional organosilane comprises at least one of 3-isocyanatopropyltriethoxysilane and 3-isocyanatopropyltrimethoxysilane.

* * * * *